Figure 1:
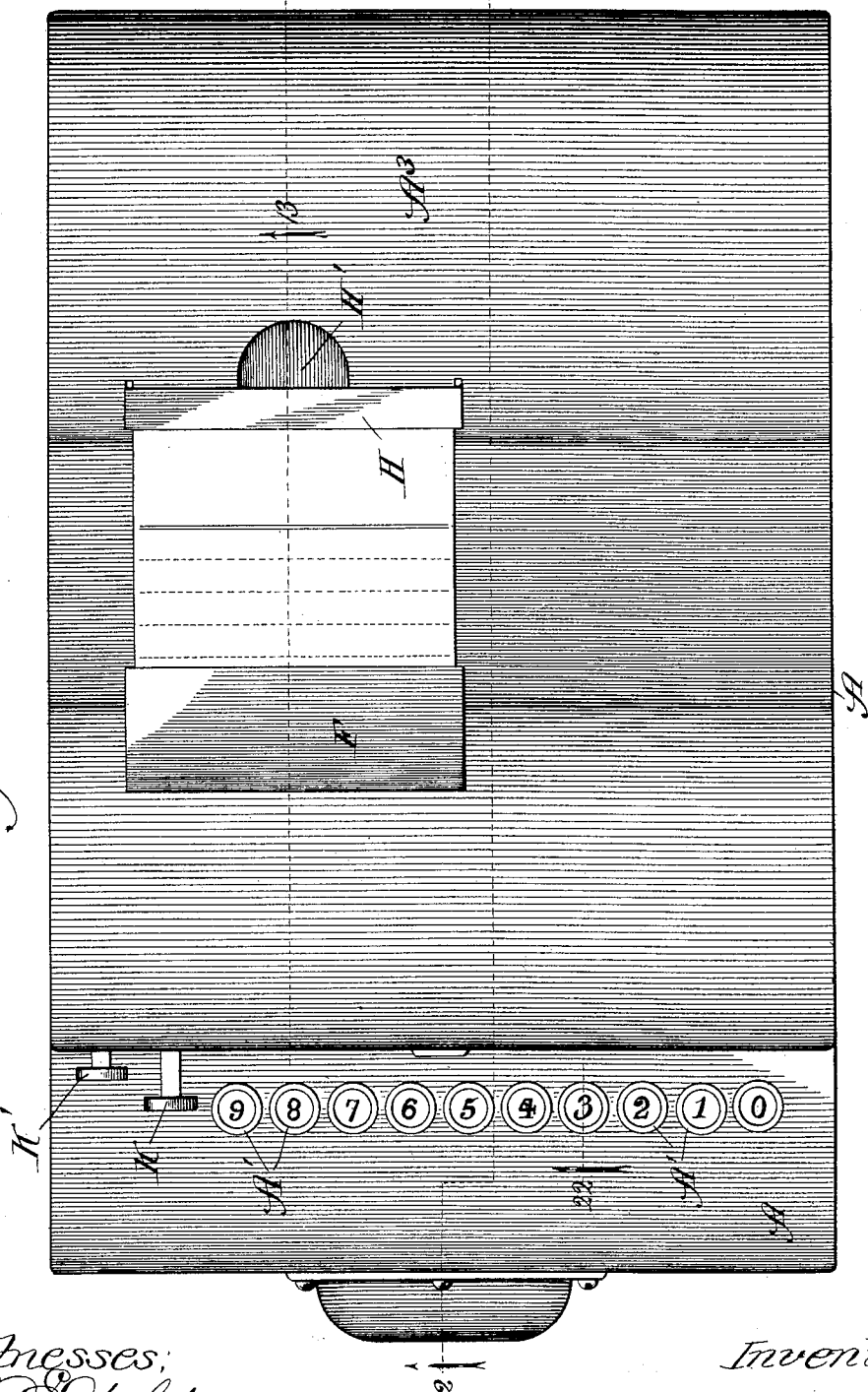

No. 633,842. Patented Sept. 26, 1899.
J. A. HOFF.
CASH REGISTER AND RECORDER.
(Application filed Mar. 31, 1898.)
(No Model.) 12 Sheets—Sheet 1.

No. 633,842. Patented Sept. 26, 1899.
J. A. HOFF.
CASH REGISTER AND RECORDER.
(Application filed Mar. 31, 1898.)
(No Model.) 12 Sheets—Sheet 4.

Witnesses:
Inventor:
John A. Hoff.

No. 633,842. Patented Sept. 26, 1899.
J. A. HOFF.
CASH REGISTER AND RECORDER.
(Application filed Mar. 31, 1898.)
(No Model.) 12 Sheets—Sheet 5.
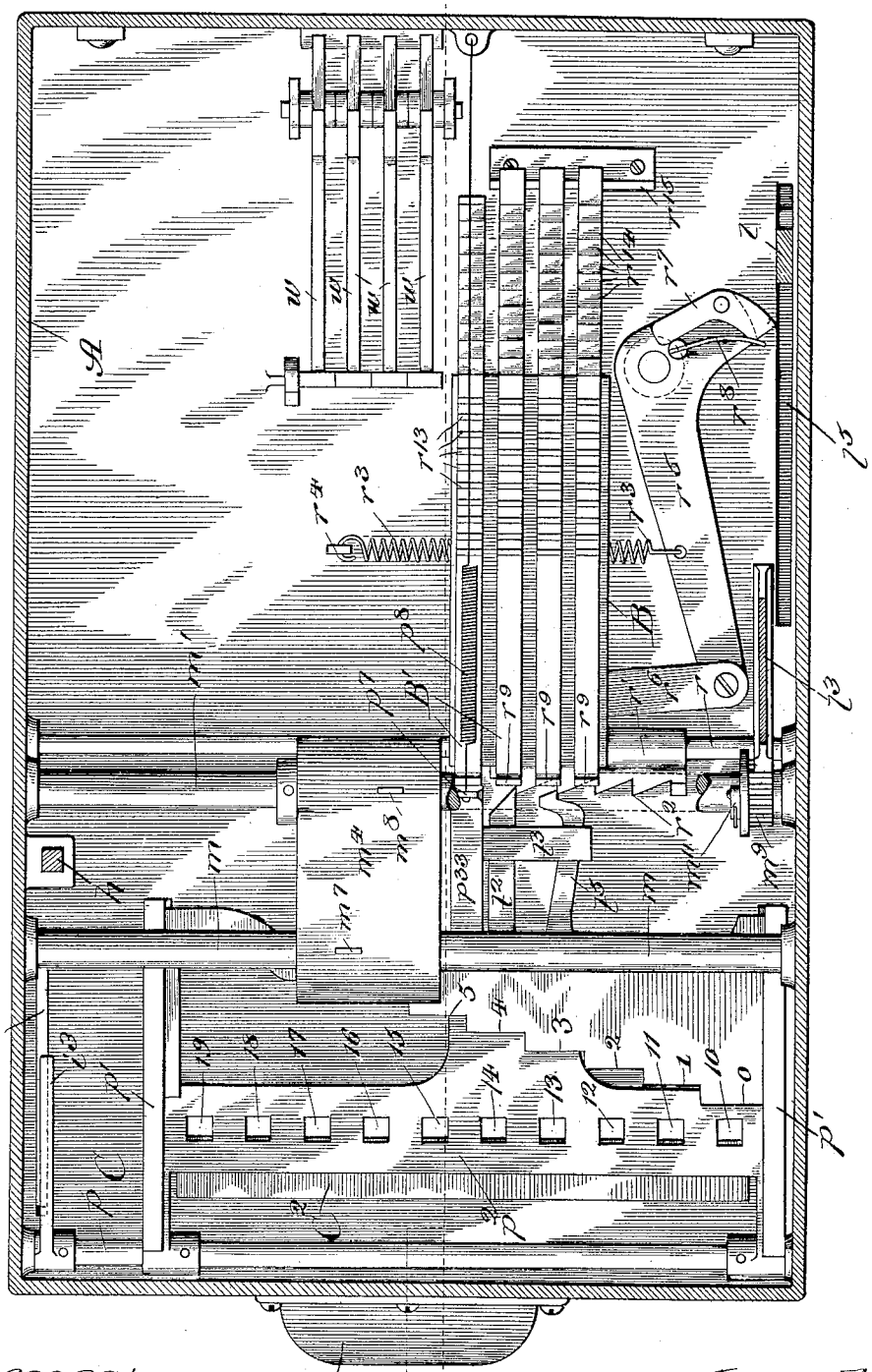
Witnesses:
Inventor:
John A. Hoff,
By Dyrenforth & Dyrenforth,
Attys.

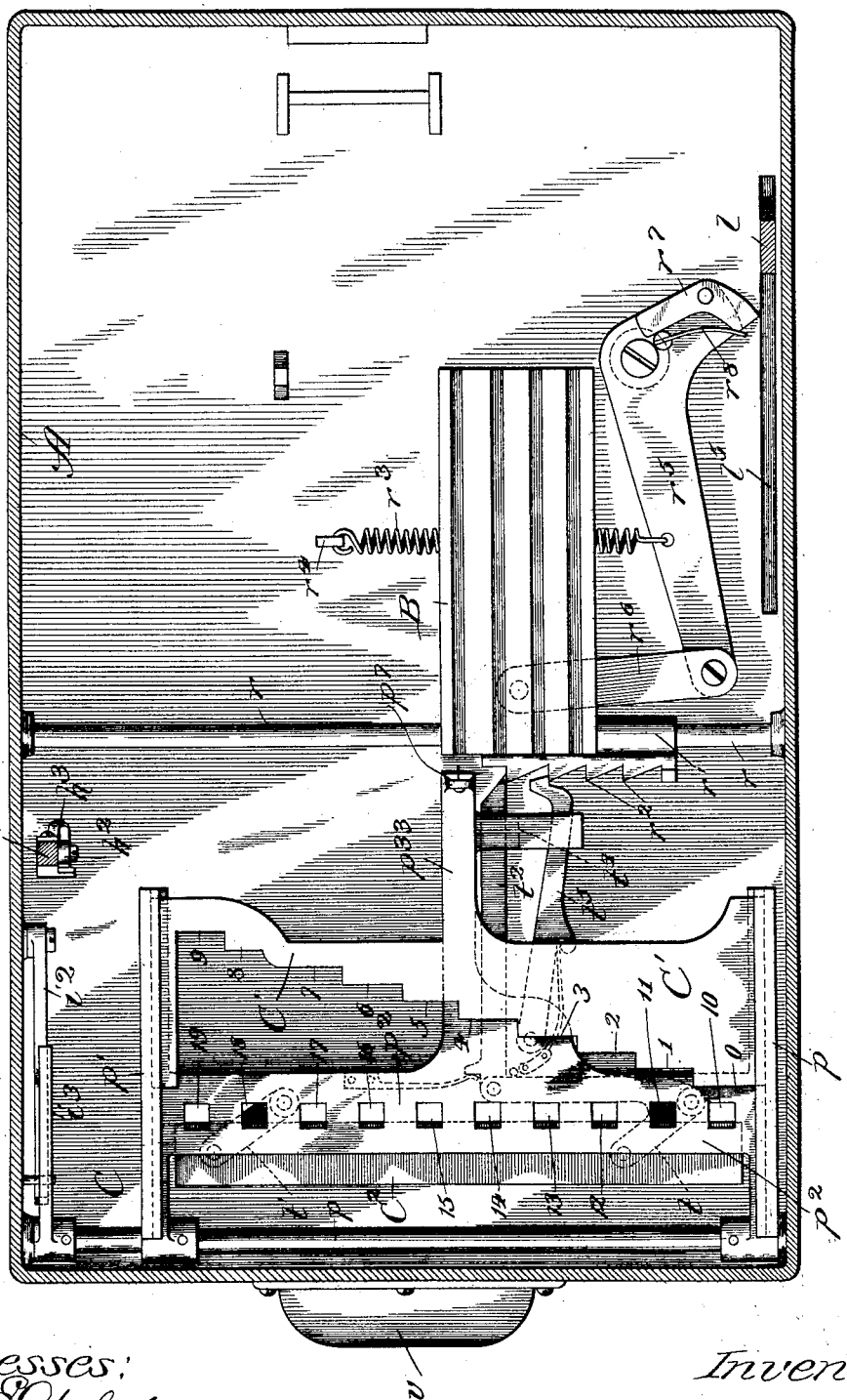

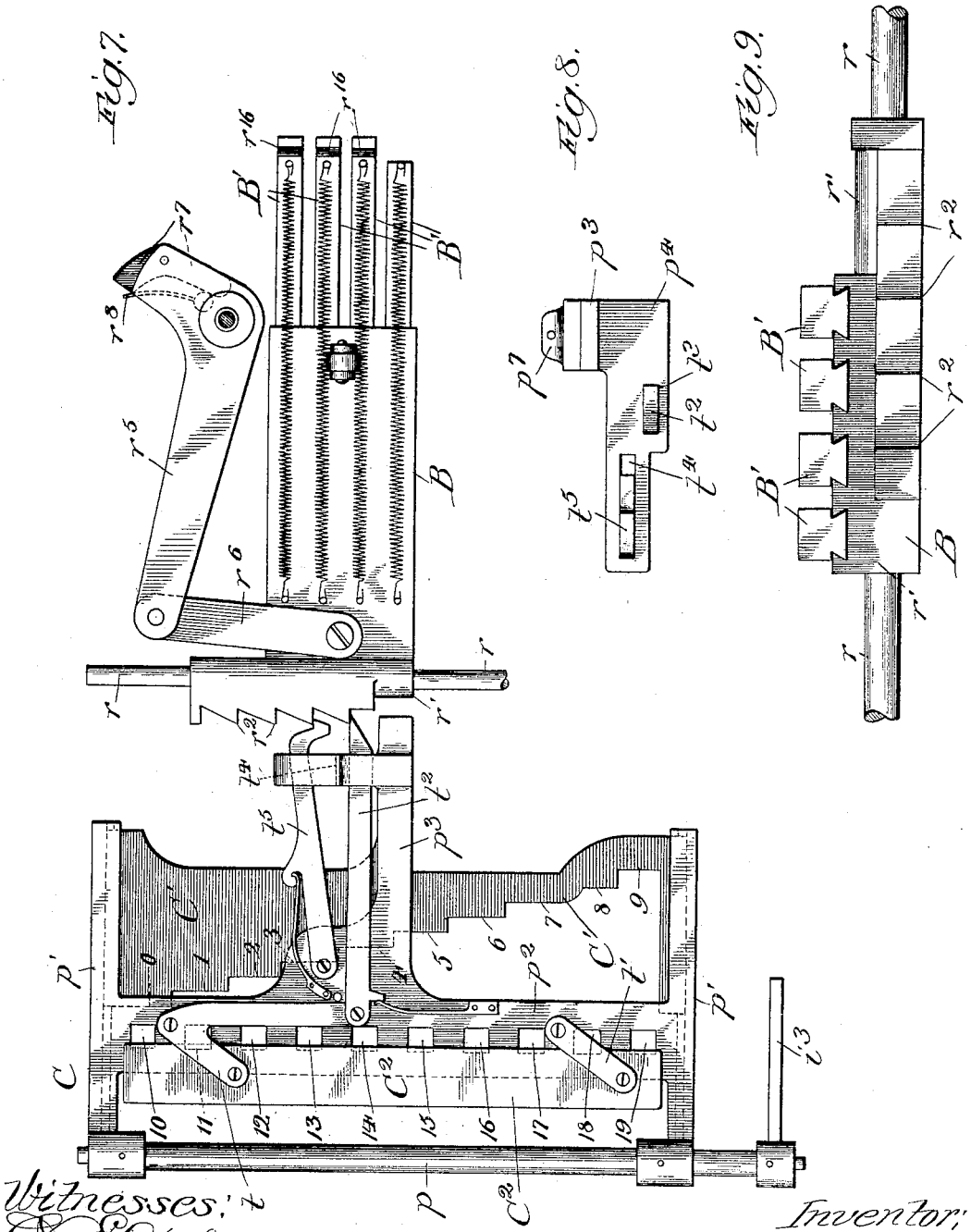

No. 633,842. Patented Sept. 26, 1899.
J. A. HOFF.
CASH REGISTER AND RECORDER.
(Application filed Mar. 31, 1898.)
(No Model.) 12 Sheets—Sheet 8.
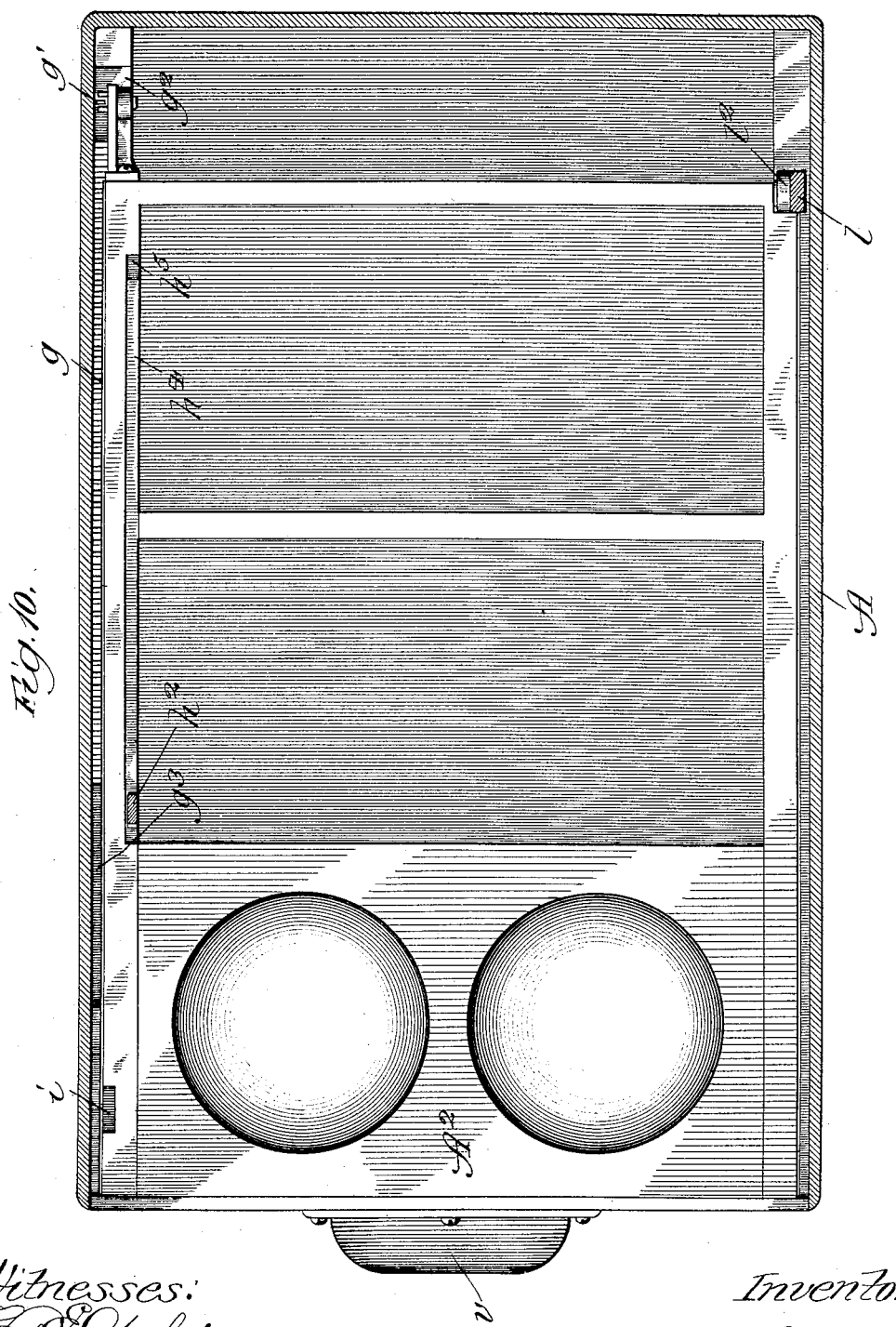

No. 633,842. Patented Sept. 26, 1899.
J. A. HOFF.
CASH REGISTER AND RECORDER.
(Application filed Mar. 31, 1898.)
(No Model.) 12 Sheets—Sheet 9.
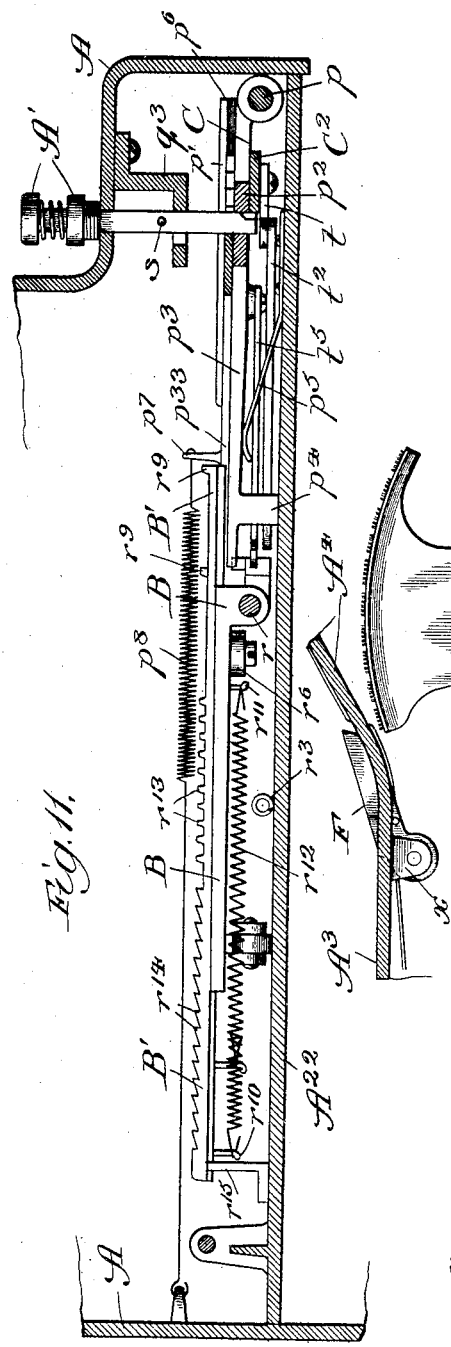
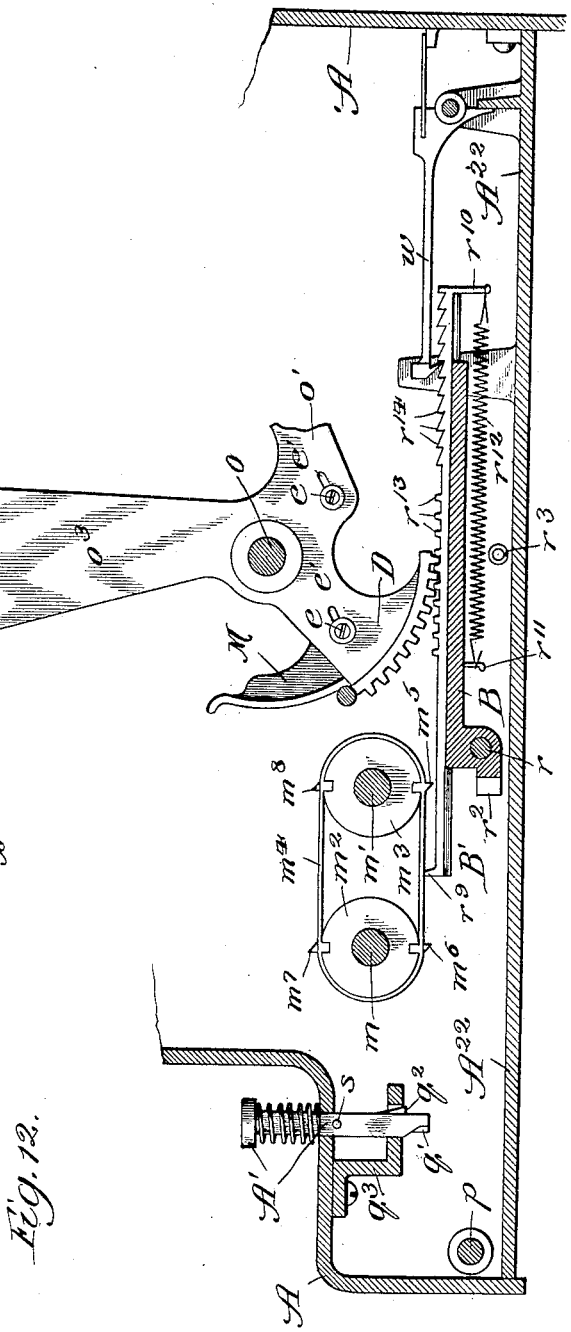
Witnesses:
Inventor:
John A. Hoff,
By Dyrenforth and Dyrenforth,
Attys.

No. 633,842. Patented Sept. 26, 1899.
J. A. HOFF.
CASH REGISTER AND RECORDER.
(Application filed Mar. 31, 1898.)
(No Model.) 12 Sheets—Sheet 10.
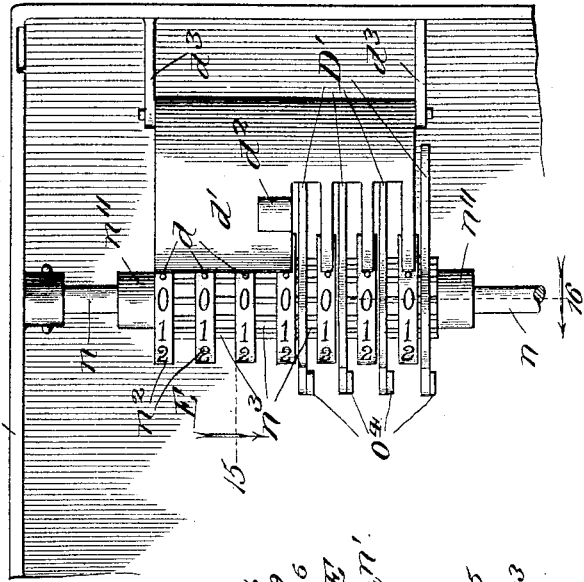
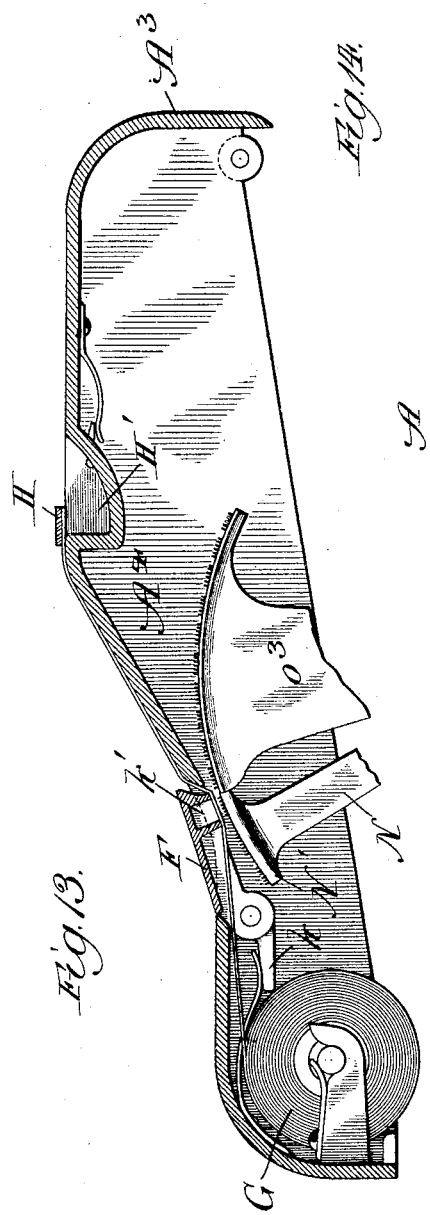
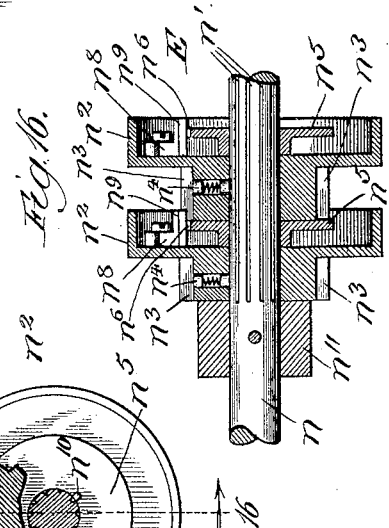
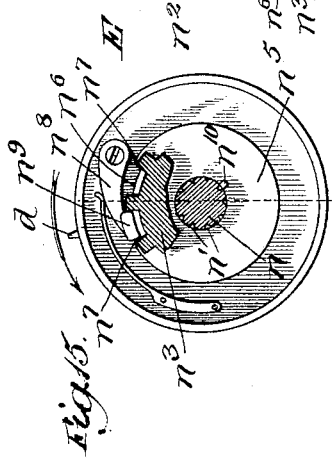
Witnesses:
Inventor:
John A. Hoff, No. 633,842. Patented Sept. 26, 1899.
J. A. HOFF.
CASH REGISTER AND RECORDER.
(Application filed Mar. 31, 1898.)
(No Model.) 12 Sheets—Sheet 11.
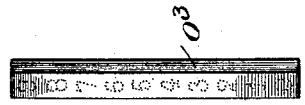
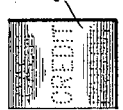
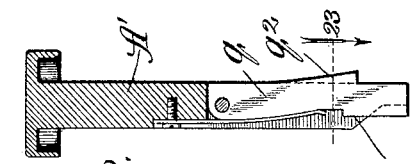
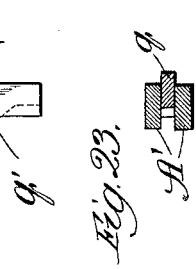
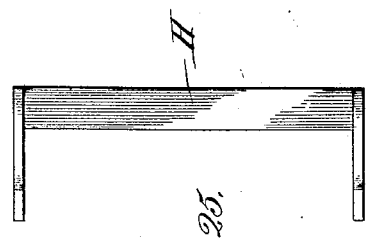
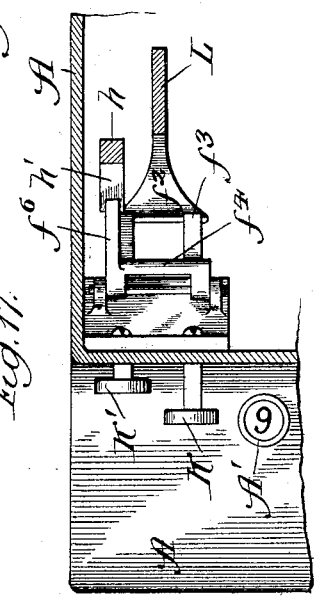
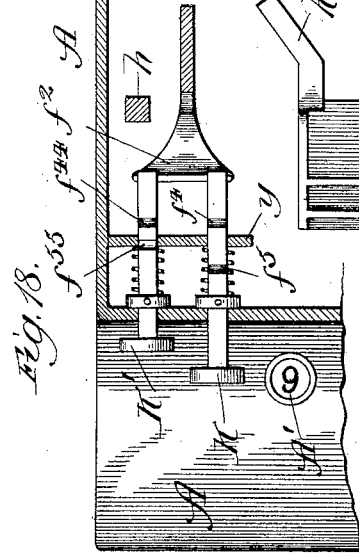
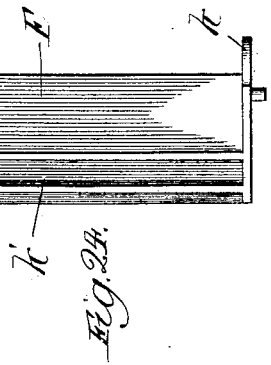
Witnesses: Inventor:
John A. Hoff,
By Dyrenforth & Dyrenforth,
Attys.

No. 633,842. Patented Sept. 26, 1899.
J. A. HOFF.
CASH REGISTER AND RECORDER.
(Application filed Mar. 31, 1898.)

(No Model.) 12 Sheets—Sheet 12.

Witnesses:
Inventor:
John A. Hoff,
By Dyrenforth & Dyrenforth,
Attys.

UNITED STATES PATENT OFFICE.

JOHN A. HOFF, OF CHICAGO, ILLINOIS, ASSIGNOR TO WILLIAM T. BLAINE, OF SAME PLACE.

CASH REGISTER AND RECORDER.

SPECIFICATION forming part of Letters Patent No. 633,842, dated September 26, 1899.

Application filed March 31, 1898. Serial No. 675,890. (No model.)

*To all whom it may concern:*

Be it known that I, JOHN A. HOFF, a citizen of the United States, residing at Chicago, in the county of Cook and State of Illinois, have invented a new and useful Improvement in Cash Registers and Recorders, of which the following is a specification.

My invention relates to an improvement in the class of key-actuated devices employed for the purpose of showing the amount of cash which should correctly be found at any time to be contained in the machine by the machine being caused to register each time it is operated, as by moving a drawer or otherwise. As this is an important function of my improved machine, it may properly be classified as a "cash-register," though it is also adapted to perform various other functions, preferably those of recording on checks to be delivered to customers the amounts of sales, recording credit sales, recording amounts paid out, and causing the register to account for amounts paid out by showing the remainder of cash that should be contained in the machine. Although, therefore, I entitle my invention an "Improvement in cash registers and recorders," I intend to be included therein any machine of the same general character adapted to be operated to show transactions whether by registering or recording or both registering and recording the items in amounts, with or without other matter of information. In this connection it should be stated that my improved machine may also be used for weights and measures as well as for money.

The primary object of my invention is to enable the registry of any desired maximum amount to be produced with the smallest possible number of actuating-keys—that is to say, to enable any amount to be registered with my improved device no more than ten keys are required, each representing a different numeral, say in the series "0" to "9." The principle I employ to this end forms the gist of the registry feature of my invention. It involves the use under control of the keys of reciprocatory bars or "rams," one being provided for each decimal place or value position of a digit within the registry capacity of the machine whether it be of amounts represented in two or in any greater series of digit-value positions. As the money denominations of most countries are in accordance with the decimal system, I refer to the decimal series of the money-value positions throughout the explanation hereinafter contained, though it will be understood that my improvement may be used equally well for registering other divisional money denominations, such as pounds, shillings, pence, farthings, &c. To illustrate, the registry capacity of the machine represented in the drawings is of amounts expressible in four figures. Accordingly four rams are provided, being supported on a carriage in horizonal series and in normally-retracted position. By depressing any key—and each key represents a number, which should be conspicuously displayed upon it—the first of the series of rams shoots out a predetermined distance and releases the carriage to enable it to move and carry the projected ram into position for proper engagement with register-actuating mechanism, whereby when the ram is returned into the carriage, as by opening a cash-drawer, operating a lever, or otherwise, it works the register.

An important peculiarity of my improved machine with the minimum number of keys is that of registering the amounts in the direction in which they would be written—that is, from left to right—whereby confusion of the operator is avoided.

Another desirable function of the machine is that of recording the amount of each sale, which is performed by the operation which produces the registering action. For recording credit sales mechanism is provided under the control of a separate key, and a separate key is provided for producing a record of each amount paid out of the machine and for causing the register mechanism to show, by actuating it in the manner hereinbefore outlined, the remainder of cash in the machine after paying out.

Figure 2:
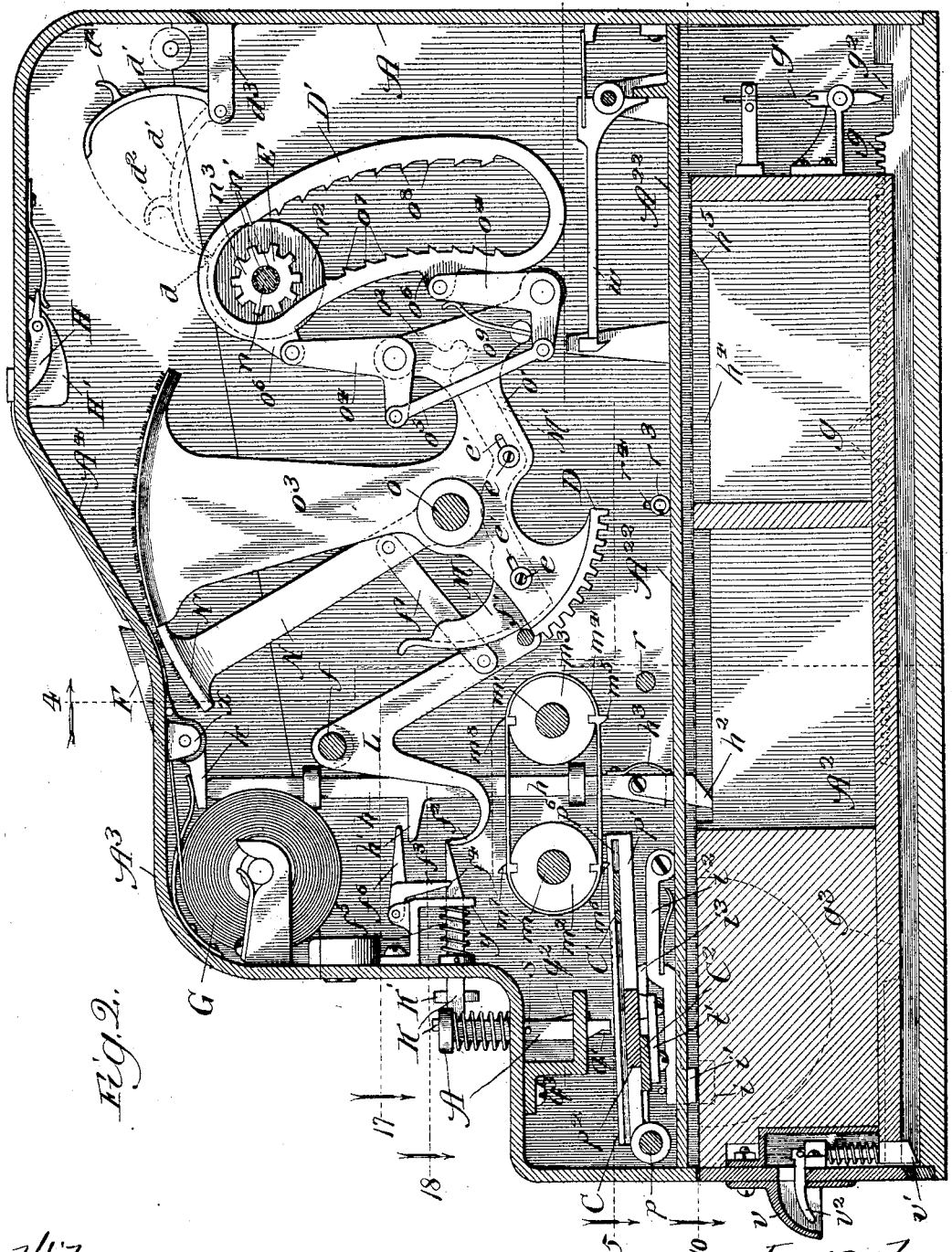
Figure 3:
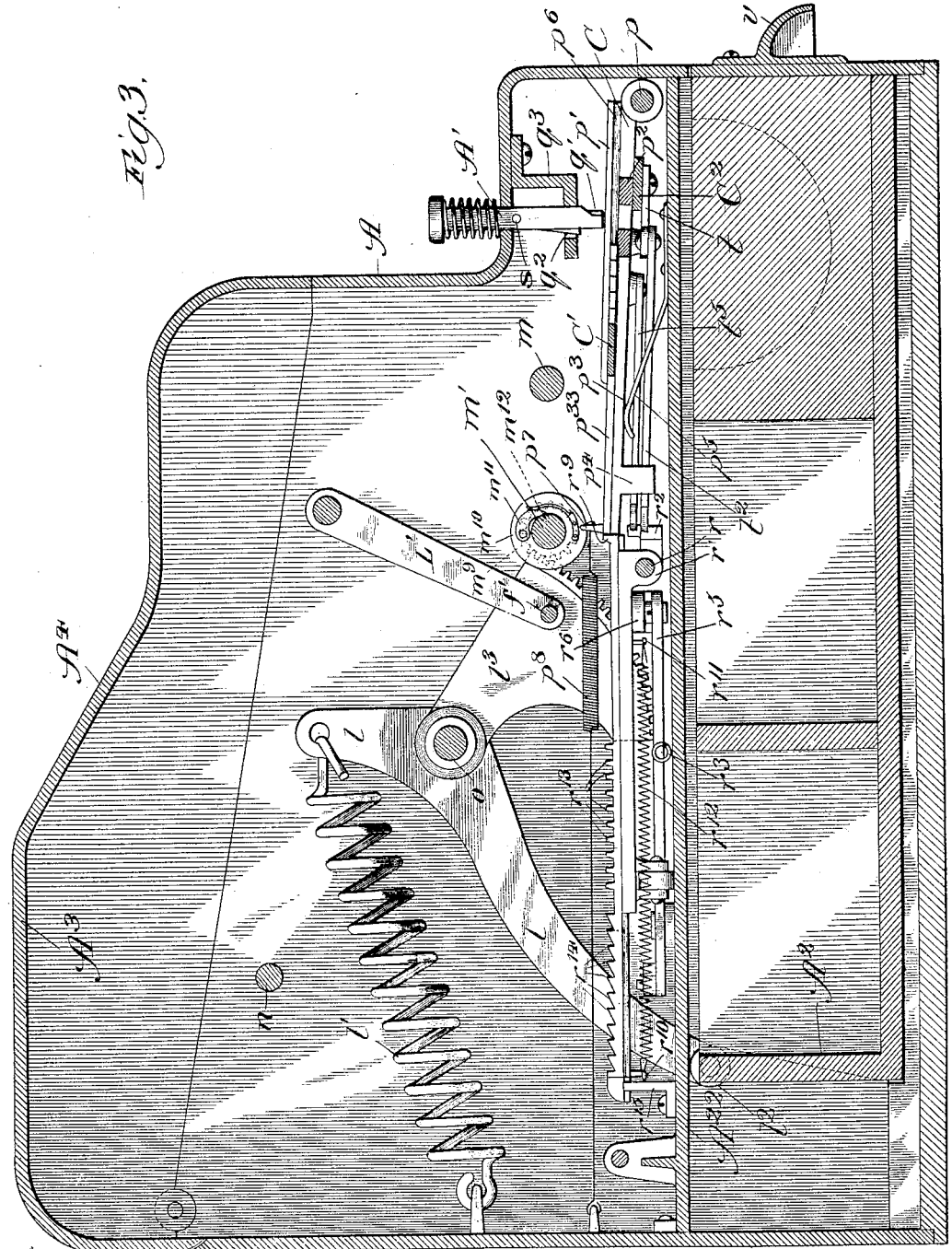
Figure 4:
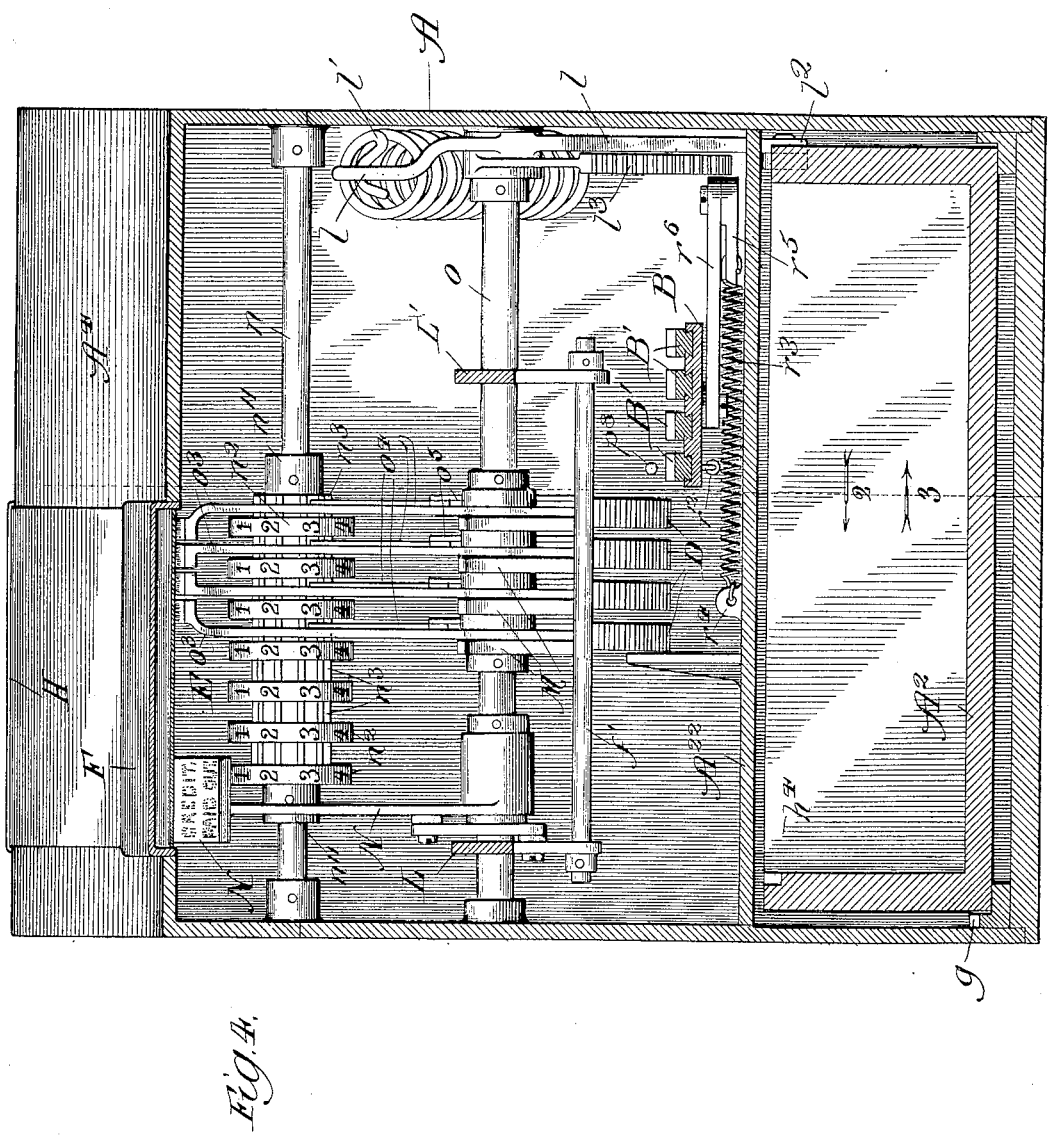

In the accompanying drawings, Figure 1 is a plan view of my improved machine; Fig. 2, a section taken at the line 2 on Fig. 1 or at the line 2 on Fig. 4 and viewed in the direction of the arrow; Fig. 3, a section taken at the line 3 on either Fig. 4 or Fig. 5 and viewed in the direction of the arrow; Fig. 4, a section taken at the line 4 on Fig. 2 and viewed in the direction of the arrow; Fig. 5, a section taken at the line 5 on Fig. 2 and viewed in the direction of the arrow; Fig. 6, a section like that presented by Fig. 5, but omitting the mechanism above the section-line on the last-named figure if that line were projected straight through the length of the machine from the point at which it begins; Fig. 7, a bottom plan view of the mechanism illustrated in Fig. 6; Fig. 8, a view in elevation of the rear-end portion of the lever device, against which the rams successively abut; Fig. 9, a broken view showing the carriage and rams in front-end elevation; Fig. 10, a section taken at the line 10 on Fig. 2 and viewed in the direction of the arrow; Fig. 11, a sectional view illustrating parts presented by Fig. 3, but showing the first or advance ram released and thrown out to produce movement of the carriage; Fig. 12, a similar view showing the aforesaid ram brought by the movement of the carriage into relation with mechanism with which it will be caused to coöperate by opening the cash-drawer; Fig. 13, a broken section taken at the line 13 on Fig. 1 and viewed in the direction of the arrow; Fig. 14, a plan view of the registering mechanism; Fig. 15, a section taken at the line 15 on Fig. 14 and viewed in the direction of the arrow; Fig. 16, a broken section taken at the line 16 on Fig. 14, viewed in the direction of the arrow and enlarged, or taken at the line 16 on Fig. 15 and viewed in the direction of the arrow; Fig. 17, a section taken at the line 17 on Fig. 2 and viewed in the direction of the arrow; Fig. 18, a section taken at the line 18 on Fig. 2 and viewed in the direction of the arrow; Fig. 19, a view in front elevation of a perforated paper check; Fig. 20, a top plan view of one of the number-recording arms; Fig. 21, a similar view of the legend-recording arm; Fig. 22, a section taken at the line 22 on Fig. 1, viewed in the direction of the arrow and enlarged, showing the key construction; Fig. 23, a section taken at the line 23 on Fig. 22 and viewed in the direction of the arrow; Fig. 24, a bottom plan view of the recording-lever; Fig. 25, a similar view of the pivotal tearing-bar; and Fig. 26, a view like that presented by Fig. 2, but showing a modification in the register-operating mechanism.

The case A may involve generally the conventional form of key-operated cash-register case, with the keys A' on the shelf portion at the forward end, and in the bottom of the case is the usual sliding cash-drawer $A^2$, which I prefer to use in my device, though other means may, as hereinbefore suggested, be substituted for operating the internal mechanism hereinafter described. The cover $A^3$ is shown to be hinged at the rear end of the case and adapted to be locked at the opposite end, and between its ends it is formed with a table-section $A^4$ at an inclination convenient for writing. The drawer is housed in a lower compartment formed in the case, with a false bottom or diaphragm $A^{22}$ provided therein.

Transversely of the case and forward of its center there extends a rod $r$, on which is supported a sleeve $r'$, carrying at its forward side ratchet-teeth $r^2$ and forming the sliding bearing for a carriage B, shown as of rectangular shape, with a series of four longitudinal dovetail grooves in its upper side, in which the rams B' are confined. The normal position of the carriage is at the right-hand side (relative to the front of the machine or end at which the drawer pulls out) of the longitudinal center of the case, and it is yieldingly held there by the tension of a spring $r^3$, fastened at one end intermediately, as hereinafter described, to the carriage to extend transversely across its base and at its opposite end to the false bottom $A^{22}$ at a lug $r^4$, projecting therefrom, Fig. 4. A bell-crank lever $r^5$, fulcrumed at its angle to the false bottom, has the free end of the spring $r^3$ connected with it to one side of its fulcrum and is pivotally connected from the free end of its longer arm by a link $r^6$ with the bottom of the carriage, the bell-crank and link thus forming the intermediate connection referred to of the spring with the carriage. On the shorter end of the bell-crank lever $r^5$ is fulcrumed a dog $r^7$, controlled by a spring $r^8$ and serving a purpose hereinafter described. Each ram B' is provided at its forward extremity with an upward-projecting tooth $r^9$, shown beveled on its rear side, and at its opposite end with a depending finger $r^{10}$, from which it is connected with a corresponding finger $r^{11}$, depending from the base of the carriage, by a spring $r^{12}$, tensioned by retracting the ram in the groove in the carriage to tend to throw it out when released. On the upper side of each ram are provided a series of rack-teeth $r^{13}$, (shown as ten in number,) and behind them the same number of ratchet-teeth $r^{14}$, and at the under side of the rear end of each ram but the first, or that at the extreme right-hand side, it is recessed, as shown at $r^{16}$, Fig. 7, to seat slidingly upon a rigid detent or holder $r^{15}$, projecting upward in suitable position from the false bottom $A^{22}$.

The keys A' (shown as ten in number and as numbered successively from "0" to "9") work through openings in the shelf at the front of the case, where they are spring-supported to maintain them normally in their elevated positions subject to depression and to rebound on being released from pressure to an extent limited by a stop $s$ on each key. All the keys A' are of the same construction. (Shown most clearly in Fig. 22.) The stem of the key is centrally recessed from its lower end to, say, near its transverse center, where there is pivotally supported in the recess a spring-controlled finger $q$, affording a power-transmitter, as and for a purpose hereinafter described, provided at its opposite edges, respectively, with the projections $q'$ and $q^2$, the projection $q'$ normally protruding at the forward edges of the lower cut-away portion of the key-stem. At their lower end portions the key-stems pass freely through guide-openings provided in an angle-plate $q^3$, supported from the under side of the shelf.

On a shaft $p$, journaled at its ends in bearings on the sides of the case near its forward end, is fastened a lever C, formed of arms $p'$ $p'$, carrying between them a plate $p^2$, extended from its rear edge near the center into a tongue $p^3$, from which there depends a rigid stop $p^4$. The arms $p'$, which are normally maintained in their raised horizontal position by a spring $p^5$, confined against the tongue $p^3$ from underneath, are provided on their inner sides, above the plane of the plate $p^2$, with longitudinal guide-grooves $p^6$ $p^6$, in which is confined a slide-plate C′, provided with a rearward-extending tongue $p^{33}$, coinciding with and overlying the tongue $p^3$ and provided, near its outer extremity, with an upward-projecting lug $p^7$, from which it is connected with the rear wall of the case by a spring $p^8$ of lighter resilient force than either spring $r^{12}$. The forward edge of the plate C′ is formed on an incline and presents ten offsets or steps, (marked in series from "0" to "9" to correspond with the keys with which they respectively coincide.) In the plate $p^2$ are provided openings shown to be of square form in series extending lengthwise of the plate. These openings are marked in succession from "10" to "19." They respectively aline with the keys A′ above them and coincide with the offsets on the forward edge of the plate C′. Another plate C² is pivotally supported near its opposite ends from the bottom of the plate $p^2$ by parallel links $t$ and $t'$, the link $t$ being extended to form a bell-crank lever carrying pivotally at its end a spring-pressed dog $t^2$, which projects normally into the path of the teeth of the carriage-ratchet $r^2$ and passes through a bearing $t^3$, Fig. 8, in the stop $p^4$. From the bottom of the plate $p^2$ there also extends through a bearing $t^4$ a spring-pressed supplemental dog $t^5$, engaging at its free end with the carriage-ratchet.

From the description thus far of the mechanism the operation will be understood to be as follows: By depressing a key A′—say that marked "5"—in the passage of the lower end of its stem through the coincident opening 15 in the plate-lever $p^2$ the projecting part $q^2$ of the transmitter $q$ bears at its lower end at the edge of the opening against the plate-lever, thereby depressing the latter against the resistance of the spring $p^5$ and removing the forward end of the tongue $p^3$ out of abutting engagement with the adjacent end of the first ram B′, which in the normal position of the carriage is held retracted in its recess in the latter by stoppage against the tongue $p^3$. The moment therefore that the plate $p^2$ is depressed by depressing a key the first ram shoots out under the recoil force of its spring $r^{12}$. In shooting out the ram encounters the tongue $p^{33}$ of the slide-plate C′, thereby forcing it forward till the offset 5 in its opposite edge engages the projecting portion $q^2$ of the transmitter $q$ on the key 5 and presses it inward, to project, accordingly, the part $q'$ at the opposite side of the key into engagement with the adjacent edge in its path of the pivotal dog-controlling plate C². As the part $q^2$ of the transmitter recedes it enters the plane of the opening 15 in plate $p^2$. The force with which the transmitter encounters the tongue on the plate C² moves the plate outward a sufficient distance to withdraw the dog $t^2$ from from the path of the ratchet $r^2$, thereby permitting the spring $r^3$ to draw the carriage, with the first of the series of rams in its projected condition, toward the left-hand side of the machine until the motion is arrested by the supplemental dog $t^5$ encountering the end of the bearing through which it passes. As will hereinafter be seen, the subsequent retraction of the ram works the register.

Extending across the interior of the case near its center is a rod $o$, carrying toward the left of the normal position of the carriage a set or bank of segmental racks D, corresponding in number and distance apart with the rams B′ and each having ten teeth. Each segmental rack has a backward-extending portion $o'$, terminating in a head $o^2$, and an upward-extending arm $o^3$, of segmental shape at its extremity, where it carries a series of numbers, from "0" to "9," formed in outline, preferably with perforating-points. These are represented most clearly in Fig. 20. On the head $o^2$ of each extension $o'$ are fulcrumed at their angles, to extend in parallel relation to each other, a pair of bell-crank levers $o^4$ $o^4$, one of which is spring-pressed, and both are pivotally connected together by means of a link $o^5$. At the ends of the longer arms of each pair of these bell-cranks they are pivotally connected with lugs $o^6$, projecting from one side of a curved slot-link D′, provided on its opposite inner sides with series of teeth $o^7$ and $o^8$, each series comprising nine teeth.

E is the register, preferably of the Pascal type, involving the following construction: About a stationary rod $n$, extending across the case near its rear end, are formed throughout a portion of the length of the rod a series of ten flutes $n'$ at equal distances apart. On the fluted part of the rod are rotatably supported a series of wheels $n^2$, each numbered "0" to "9" about its rim, seven of these being shown, though more or fewer may be provided. As shown, each wheel $n^2$ has its perimeter extended as a rim laterally toward the left to afford the surface for carrying the numbers and to render the wheel reëntrant or annularly open at one side, and at the closed left side of each wheel and formed by preference integral with it is a ratchet $n^3$, containing a spring-controlled brake-tooth $n^4$, projecting through the ratchet into the plane of the flutes $n'$. Each ratchet $n^3$ extends for a short distance past or laps the annular rim of the next adjacent wheel, in which it abuts against a spacing-disk $n^5$, provided in its circumferential edge with a recess $n^6$ of a length equal or about equal to the width of two spaces between ratchet-teeth. The opposite ends of the recess in each spacing-disk are slightly beveled or cam-shaped, as shown at $n^7$ in Fig. 15. To the inner surface of the closed side of each wheel $n^2$ is pivoted a spring-pressed pawl $n^8$, terminating at its free end in a lateral extension or finger $n^9$, shown as of approximately rectangular cross-section and long enough to enter the recess $n^6$ of the adjacent disk $n^5$ and also engage with the teeth of the ratchet $n^3$ next to that disk. The disks $n^5$ are stationary, being so maintained by keys $n^{10}$, (see Fig. 15,) extending from them into engagement with a flute in the rod $n$, and the members of the register are confined in place on the rod $n$ between collars $n^{11}$ $n^{11}$.

With the understanding that the recesses $n^6$ in the successive disks $n^5$ permanently coincide with each other and that a pawl $n^8$ is only in a recess $n^6$ when its wheel registers "0" or has made a complete revolution the working of the register irrespective of the mechanism I employ for operating it, but which is hereinafter explained, will be comprehended from the following description: With the pawl $n^8$ on the units-wheel or that at the extreme right of the series of wheels in the position shown of the pawl in Fig. 15, (and which may for the purpose of explanation be presumed to be in the recess of the next adjacent disk $n^5$ and the teeth of the tens-wheel ratchet,) turning the units-wheel ratchet $n^3$—say, in the direction of the arrow on Fig. 15—rides the pawl-finger on the units-wheel out of the recess $n^6$ up the adjacent cam end $n^7$ thereof, thus without disturbing the tens-wheel $n^2$ until the units-wheel shall have made a complete revolution. Then the pawl-finger of the units-wheel will have reached and have dropped into the recess of the first disk $n^5$, being thus brought into the plane and in front of the tooth of the second ratchet-wheel, which is presented between the ends of the recess, so that the next turn of the units-wheel to or beyond the "0" within one complete revolution will turn the tens-wheel the extent of one tooth of its ratchet or until the finger of the pawl on that wheel again reaches the position shown in Fig. 15. Each complete revolution of the units-wheel brings its pawl-finger into the recess of the disk of the tens-wheel against the middle tooth of the ratchet there presented to cause the tens-wheel to be turned one tooth. In the same way each complete revolution of the tens-wheel produces one-tenth of a revolution of the hundreds-wheel, and so on throughout the series. The keys A' are depressed in the order of the occurrence from left to right of the figures in the amounts to be registered. According to the arrangement of the mechanism in the present machine, as illustrated, no provision is made, though it could be, for registering any amount greater than is expressible with four figures, thus either and preferably from tens of dollars to cents or from thousands of dollars to dollars. After depressing all the keys required to express the amount to be registered the next operation is to pull out the cash-drawer A².

For the purpose of the explanation in the present connection it may be presumed that only one key has been depressed to denote a sale in an amount expressible in units of cents. As hereinbefore explained, this key depression has released the first ram B' and caused the carriage to move one step. The movement of the carriage brings the projected ram coincident with the first segmental rack D, as shown in Fig. 12. The teeth $r^{13}$ on the ram slide into engagement with those on the rack by the described movement of the carriage. The distance to which the ram is shot out is determined by the offset in the plate C' which it encounters, and that determines the tooth in the series thereof on the ram which engages the extreme or innermost tooth of the rack. Thus if the key 5 be the one depressed the first ram will be projected far enough to bring its sixth tooth (counting from the forward ram end) against the back of the innermost tooth on the first rack D, whereby when the ram is forced home in its carriage it will turn the rack the extent of six teeth, with the result hereinafter described.

In the case, near its forward end, are journaled, to extend transversely across it, two parallel shafts $m$ and $m'$, carrying, respectively, the drums $m^2$ and $m^3$, in alinement with the set of segmental racks D. About the drums there extends an endless apron $m^4$, formed, preferably, of metal, to be driven by rotation of the shafts and provided with projecting rigid abutments $m^5$, $m^6$, $m^7$, and $m^8$, in number corresponding with the number of rams, thus four in the present arrangement, placed at equal distances apart about the apron on different planes, respectively coinciding with the different segmental racks, and thus with the respective rams when each is brought into engagement with a different one of the segmental racks. The shaft $m'$ carries loosely on one end at the right-hand side of the case a pinion $m^9$, provided at its inner side with an enlargement in the form of a disk $m^{10}$, on which is pivoted a spring-pressed dog $m^{11}$ to engage with a notch (indicated at $m^{12}$ in Fig. 3) formed in the shaft $m'$. On the rod $o$ is fulcrumed at its angle, coincidently with the pinion $m^9$, a bell-crank lever $l$, Fig. 3, yieldingly connected from its shorter arm with the back of the case by a strong spring $l'$ and bearing at a thimble $l^2$, on the extremity of its lower arm, against a shoulder on the rear end of the drawer A².

Connected or integral with the bell-crank at its angle to move with it is a segmental rack $l^3$, meshing with the pinion $m^9$.

To pull out the drawer $A^2$ by the grip, (shown at $v$,) it is first unlocked by lifting the spring-bolt $v'$ at the handle $v^2$. In the opening movement of the drawer the spring $l'$ causes the thimble end of the lever $l$ to follow the drawer, thereby turning the lever on its fulcrum and simultaneously turning the segmental rack $l^3$ against the pinion $m^9$ to rotate it, and, through the engagement of the dog $m^{11}$ with the shaft $m'$, turn the latter through two complete revolutions and with it the apron.

The projected ram $B'$ being in the position in which it is represented in Fig. 12 and in which it is held by a pivotal spring-pressed dog $w$, engaging the ratchet-teeth $r^{14}$, (one such dog being provided for each ram,) is in the path of the abutment $m^5$ on the traveling apron, which accordingly upon a complete revolution forces the ram back in its groove in the carriage, with the result of turning the segmental rack D, with which the ram engages, the extent of six teeth—that is, from the "0" tooth to the "5" tooth, so to speak. The dogs $w$ hold the rams by the teeth $r^{14}$ at every point in their backward movement. This turning of the rack D lifts the slot-link D', connected with it, till five of its rack-teeth $o^7$ have engaged five teeth in their path of the ratchet $n^3$ of the register, thereby turning the ratchet the extent of five teeth to display the number "5" upon it if the "0" were previously displayed. The movement of the leading tooth $o^7$ (or $o^8$) is so timed that when the rack D turns the extent of any number of teeth the ratchet $n^3$ will be turned one tooth less. If two, three, or four of the keys A' have been struck, the dog $t^2$ will have been released from and engaged with the ratchet $r^2$ a corresponding number of times to permit the spring $r^3$ to move the carriage step by step accordingly and project at each a ram to be moved sidewise with the carriage into engagement with a segmental rack to the extent of the number of teeth corresponding with the number on the key depressed to effect its projection. The dog $t^5$ is placed so high in the plane of the teeth $r^2$ that each time the tongue $p^3$ rises to resume its normal position, while the dog $t^2$ engages the teeth to hold the carriage, the dog $t^5$ clears the ratchet-teeth to be retracted by its controlling-spring for a fresh grip, when the plate $p^2$ is again depressed by actuating a key. In each step movement of the carriage a ram $B'$, after the first, is released by being slid at the recess in its rear end off the retainer $r^{15}$.

If, say, by way of explanation, it be desired to register by the machine a sale of forty-five dollars and eighty-three cents, four of the keys A' will be depressed in the order "4, 5, 8, 3." With the first key depression the first ram will be projected the extent of five teeth and will be moved by the carriage under the first segmental rack D. With the second key depression the carriage will move another step, bringing the first ram under the second segmental rack, and the second ram, previously released from its retainer $r^{15}$ to permit it to project the extent of six teeth, under the first segmental rack. With the third key depression the carriage will move another step, bringing the first ram under the third segmental rack, the second ram under the second rack, and the third ram, previously released from the retainer to be projected the extent of nine teeth, under the first rack. With the fourth key depression the carriage will move another step, bringing the first ram under the fourth segmental rack with five of its teeth behind the advance rack-tooth, bringing the second ram under the third rack with six of its teeth behind the advance rack-tooth, bringing the third ram under the second rack with nine of its teeth behind the advance rack-tooth, and bringing the fourth ram, previously released from the retainer $r^{15}$, under the first rack with four of its teeth behind the advance rack-tooth. While the carriage is moving laterally the dogs $w$ form a species of track for the teeth $r^{14}$, which they engage, to hold the rams in their several projected positions until retracted, as hereinafter described. It will be understood that the retainer $r^{15}$ is shorter than the width of the carriage by the width of one ram, so that the first step movement of the carriage already slides the second ram off the retainer to abut against the tongue $p^3$ and be held from shooting out till the second key is depressed. Thus the first ram is normally retained by the tongue $p^3$, and each succeeding ram is normally retained by the retainer $r^{15}$ and successively by the tongue to effect the release of each in turn by depressing a key. It will also be understood that when a ram is projected and the carriage is moving the tongue $p^3$, which is narrower than the distance between the longitudinal centers of successive rams, has time to rise under the action of spring $p^5$ and to get up to oppose the ram before it has moved entirely off the retainer $r^{15}$.

With the four rams engaging the segmental racks in the manner described, opening the drawer permits the spring $l'$ to act upon the lever $l$ and rack $l^3$ to rotate the shaft $m'$ twice around, thereby actuating the apron $m^4$ once around and causing the abutments on the apron to encounter the four projected rams and shove them, one at a time, back in their grooves in the carriage. The arrangement is such that no two rams are simultaneously under retractive motion, the abutments on the apron being so placed that the ram in the path of abutment $m^6$ is moved first, followed in succession by the rams in the paths of abutments $m^7$, $m^8$, and $m^5$. Thus the four segmental racks D will each be turned as far as the number of teeth on the ram engaging it will move it and will correspondingly move the four slot-links D', the fourth to engage four teeth $o^7$ with its ratchet $n^3$ of the register E, the third to engage five of these teeth with its ratchet, the second to engage eight of the teeth with its ratchet, and the first to engage three of the teeth with its ratchet. In this way, if at the beginning of the operation the register were set at "0," as it may be at the end of each day—that is to say, with a row of ciphers displayed on the series of rings—the described operation of the mechanism will cause the register to display the number "4,583." Each amount thereafter repeated by depressing one or more of the keys A' will, by the described operation of the register-actuating mechanism under the opening movement of the drawer, be shown by the register in the sum of such amount added to the amount previously on the register-wheels. The same operation which has effected raising of the slot-links D', or any of them, turns each arm $o^3$ on a segmental rack D a corresponding distance to bring the perforating-number of the series thereof on the segment-shaped end of the arm $o^3$ into coincidence with an opening in the cover $A^3$ at the base of the table-section $A^4$ therein. In this opening is supported a spring-pressed lever F, fulcrumed on ears $x$, depending from the under side of the cover near one end of the opening and having at one end an arm $k$, extending forward with relation to the keyboard of the machine. The width of this lever should be at least that of the bank or series of arms $o^3$ to extend across their plane, and it is provided on its lower side, near the rear edge, with a longitudinal recess $k'$, Fig. 13, into coincidence with which the number on the head of each arm $o^3$ to be perforatingly recorded is brought by actuating the register mechanism in the manner described. Adjacent to the lever F there is journaled on the cover $A^3$, at the forward end of the case, a roll G of record-paper, one end of which is passed across the recess $k'$ in the lever F, out through the opening along the top of the cover, under a spring-pressed tearing-off lever H, fulcrumed on the cover in a depression H' therein, by which to enable the operator to get with his hand under the tearer to grasp the paper for drawing it out after it has been written on at the table $A^4$ and preparatory to tearing it off to afford a check to be handed the customer or for other purpose.

In the upper edge of the left-hand side of the drawer, near its forward end, is a recess $i$ to receive, when the drawer is closed, a stop $i'$ on the end of a spring-pressed lever $i^2$, which extends directly underneath an arm $i^3$, extending from one end of the rock-shaft $p$. When the lever-plate $p^2$ is depressed by actuating a key A', the arm $i^3$ is simultaneously turned against the lever $i^2$ to depress it and hold the stop $i'$ in the recess $i$ to prevent the drawer from being opened prematurely. Moreover, when the drawer is opened no ram can be operated, since then the stop $i'$ will be out of coincidence with the recess $i$, so that the lever $i^2$ will not yield to pressure from the arm $i^3$ and the plate $p^2$ cannot be depressed.

By the step movements of the carriage B the short dog $r^7$ on the upper side of the short arm of the carriage-spring lever $r^5$ is protruded farther and farther by each step movement into the path of the primary actuating-lever $l$. As the drawer is pulled out the lever $l$, which works through a slot $l^5$ in the false bottom $A^{22}$, freely passes the dog $r^7$ as it yields in that direction. When the lever $l$ reaches the forward end of the slot $l^5$, it is stopped, while the drawer continues in its opening movement.

A thrust-rod $h$, having a laterally-extending rigid finger $h'$ for a purpose hereinafter described, is supported in perpendicular position to adapt it to move up and down, with its upper end extending against the spring-pressed arm $k$ of the lever F, and on its lower end this rod carries a shoe $h^2$, beveled on its under side, Fig. 2, and held normally in alinement with the rod by a spring $h^3$. The shoe $h^2$ projects into a longitudinal recess $h^4$, formed in the upper edge of the left-hand side of the drawer and beveled at its rear extremity to form a cam end $h^5$, corresponding with the bevel on the shoe $h^2$. When the lever $l$ is stopped at the forward end of its slot in the false bottom $A^{22}$, the cam end of the slot $h^4$ has reached the shoe $h^2$, and by continuing the opening movement of the drawer the cam $h^5$, by its engagement with the shoe, forces the thrust-rod $h$ up against the arm $k$ of lever F, thereby depressing the recess $k'$ thereon against the paper and pressing the paper against the number or series of numbers brought coincident with the recess, as described, and formed preferably with perforating-points. In this way the number struck by depressing one or more keys A' will be recorded on the paper, which when torn off affords the check I. (Shown in Fig. 19.)

Along the bottom of the right-hand side of the interior of the case there extends a rack $g$, and coincident with this rack there is supported to yield in both directions a spring-dog $g'$ on the rear end of the drawer. With the drawer pushed in to its full extent the dog $g'$ depends and rights itself in a recess $g^2$ behind the rack, and a similar recess $g^3$ is provided at the front end of the rack to admit the dog and permit it to right itself when the drawer is fully drawn out. In pulling out the drawer the dog rides at an angle over the rack, but obstructs any attempt to close the drawer till after it shall have been fully opened, and in the closing operation of the drawer the dog also rides over the rack at the opposite inclination to prevent opening the drawer till it shall have been fully closed. The dog and rack afford a safety device for preventing the operator, by only partially opening and closing the drawer, from causing the operation of the mechanism to do otherwise than register and record the amount for which the proper keys are depressed.

In completing the opening movement of the drawer it passes the shoe $h^2$, thereby permitting the spring of the arm $k$ to depress the rod $h$ and return the lever F to its normal position. By closing the drawer $A^2$ the lever $l$ in being forced back against the tension of its controlling-spring $l'$ encounters the dog $r^7$ on the carriage-lever $r^5$, thereby turning it to draw back the carriage to its initial position and tension the spring $r^3$ for subsequently moving the carriage. By the backward turning of the lever $l$ the rack $l^3$ rides backward against the pinion $m^9$, thereby turning it freely through two revolutions without moving the shaft $m'$ and bringing the dog $m^{11}$ again coincident with the notch $m^{12}$ to be ready for turning the shaft when the drawer is again opened. By returning the carriage to its normal position the teeth $r^{13}$ on the rams are all removed out of engagement with the segmental racks D, thereby leaving them without support, so that they return to their normal positions by the weight of the slot-links D', which causes them to drop, carrying with them the arms $o^3$, to their normal position. In dropping, the teeth $o^7$ on the slot-links slip over the teeth of the ratchets $n^3$ in their paths without turning the ratchets, owing to the resistance to their turning afforded by the spring brake-teeth $n^4$ engaging the flutes in the rod $n$. Moreover, the slot-links yield in dropping by the resilient give in the springs bearing against the lower members of the pairs of bell-cranks $o^4$.

I have also provided in this machine for causing it to register by subtraction and record amounts paid out, and also to furnish records of credit-sale amounts. For the first-named purpose the following mechanism is provided:

K is a spring-key supported in the front wall of the case near the left-hand side of the machine, within which it passes freely through a bearing $y$. Toward its inner end this key is beveled to render it cam-shaped on its under side. A pair of levers L L', fulcrumed on a rod $f$, are connected together at their lower ends by a rod $f'$, extending across the plane of the series of segmental racks D. One of these levers L is in the form of a bell-crank turned up and forward toward the lower end of its shorter arm into an expanded lip $f^2$, which bears at its edge against the cam-surface of the "paid-out" key K. On the top of the bearing $y$ is pivoted a dog $f^3$, which depends into contact with the back or top of the key K, in which are provided at a proper distance apart two notches $f^4$ and $f^5$, in line with each other, for engagement with the dog. An arm $f^6$ extends from the dog $f^3$ into the path of and over the finger $h'$ on the thrust-rod $h$, to be tripped by the rise of that rod.

M M are heads of general segmental form, terminating in stems M'. One of these heads is fastened to a side of each segmental rack D and its extension $o'$ through elongated slots $e'\ e'$ therein in a manner to afford to the head M and its stem a limited movement independent of the segmental rack, on which it is supported. The connecting-rod $f'$ of the two levers L L' bears against the backs of the heads M, and the stems M' bear at their extremities against curved fingers $o^9$, depending from the angle portions of the upper bell-cranks $o^4$, on which the slot-links D' are carried.

On the rod $o$ is fulcrumed to extend in the plane of the lever F an arm N, connected by a link $f^7$ with the long arm of the bell-crank lever L and terminating in a segment-shaped legend-bearing head N', the legend-matter shown being the words "Cash," "Credit," and "Paid Out," formed, preferably, with perforating-points and arranged at equal distances apart across the head. The uppermost word, "Cash," is normally in the position indicated in Fig. 2, wherein it perforates the paper G, as shown on the check I in Fig. 19, whenever the lever F is actuated while the arms $o^3$ are in the position to which they are turned to perforate the paper, with the amount of a sale registered on the wheels $n^2$ by turning them in the manner already described.

When an amount is to be paid out of the machine, the proper keys A' are first depressed in the order explained, thereby effecting in the manner hereinbefore described movements of the carriage B to bring one or more projected rams in proper order into engagement with the respective number of segmental racks D. Then the key K is pushed, clearing the dog $f^3$ from the forward notch $f^4$ in the key, and when the key has been pushed in so far as to cause the rear notch $f^5$ to coincide with the dog the latter engages it to hold the key against retraction under the recoil of its controlling-spring. By pushing in the key K the engagement of its cam end with the lip $f^2$ swings the bell-crank L in the direction to turn the arm N far enough to bring the final words "Paid out" on its head N' into coincidence with the recess $k'$ of lever F. The further result of pressing the key K is to press the connecting-rod $f'$ against the heads M, and thereby force their stems M' against the row of bell-crank fingers $o^9$. This action pulls forward the series of slot-links B' to bring their teeth $o^8$ into position to engage the teeth of the respective ratchets $n^3$ when the slot-links are raised. The next step in the operation is to open the drawer, with the effects of actuating the apron $m^4$ to push each of the projecting rams back in its groove in the carriage, raising the corresponding number of slot-links to engage their teeth $o^8$ with the respective ratchets $n^3$ to turn the latter backward, and bringing the arms $o^3$ into position relative to the lever F to expose to the paper G the amount paid out. This amount is obviously shown by subtraction on the register as the remainder of cash in the machine. In the opening movement of the drawer the thrust-rod $h$ is raised, thereby causing the finger $h'$ to trip the dog $f^3$ and permit the key K to be returned by its spring to normal condition and actuating the lever F to press the paper for the check I against the perforating matter coinciding with the recess $k'$ on the heads of the arms $o^3$ and N. Of course when the key K returns to its initial position the levers L L' are released to permit them to resume their normal position and return there the arm N, as also to permit the heads M and stems M' to resume, under the force of the springs which press against the bell-cranks $o^4$, their normal position, and the slot-link D' to right itself with relation to its ratchet $n^3$ by bringing the teeth $o^7$ into the plane of the ratchet-teeth. It will be noticed that the surfaces of the heads M against which the rod $f'$ bears are formed on a circle, whereby the rod always bears against them in any position to which they are turned by turning the racks D. Closing the drawer returns the carriage B to its initial or normal position and frees the one or more raised slot-links D' to permit dropping thereof by gravity without effecting the register and return to its normal position each segmental rack D and arm $o^3$ that has been actuated.

To record a credit sale the key K' is provided. This key is formed like the key K — that is, cam-shaped at its inner end, where it bears against the lip $f^2$ of the bell-crank lever L; but it is shorter and has a shorter throw than the "paid-out" key and is provided with the notches $f^{44}$ and $f^{55}$ for engagement by the dog $f^3$, and accordingly closer together than the notches in the longer key. By pressing in the key K' its cam end turns the levers L L' at the lip $f^2$ only enough to swing the arm N so far as to bring the intermediate word "credit" on its head N' into coincidence with the paper-crossed recess $k'$ of the lever F. At the same time the pressure of the connecting-rod $f'$ against the heads M advances the stems M' only sufficiently against the fingers $o^9$ to turn the bell-cranks $o^4$ far enough to center the slot-links D' with reference to the ratchets $n^3$, so that the latter will be between the planes of the slot-link teeth and will not be touched by them in the rise of the slot-links in order thereby to avoid disturbance of the register when the amount of the credit sale is recorded. This is done by depressing, previous to operating the key K', the key or keys A', representing the amount to be recorded, thereby setting the carriage B and proper number of rams B'. By then opening the drawer the ram-returning action ensues, with the accompanying setting of the arms $o^3$ to present the amount of the sale to the paper-crossed recess $k'$ of the lever F and accompanying rise of the one or more slot-links D', though without any action of the latter upon the register E, and the final movement of the drawer in opening raises the rod $h$ to actuate the recording-lever F and trip the dog $f^6$ by engagement therewith of the finger $h'$ to permit the key K' to return to its normal position. The effect of closing the drawer is to return in the manner hereinbefore described the carriage, each raised slot-link, and the arms $o^3$ and N' to their respective initial positions.

At desired periods the rings $n^2$ of the register should be set to "0." To enable this to be done with facility, I provide in corresponding position on the rim of each ring a tooth $d$. A stop-lever $d'$, having a handle $d^2$ extending along its back, is fulcrumed between arms $d^3$, projecting forward from the back of the case. This lever is normally in raised position. On opening the cover $A^3$ and dropping the lever $d'$ the operator makes a note of the amount shown by the register as being contained in the machine. Then by gripping with the hand under the segmental heads of the arms $o^3$ and turning them forward the four slot-links D' are raised to engage their teeth $o^7$ with the ratchets $n^3$ in their paths, and thereby turn each wheel $n^2$ controlled by a slot-link till its tooth $d$ strikes the stop-lever $d'$ and is arrested at "0." The several rings $n^2$ at the left of the series thereof controlled by slot-links may each be moved back to "0" by turning them by hand until their teeth $d$ strike the stop-lever. On releasing the arms $o^3$ the slot-links fall back to normal position.

Figure 26:
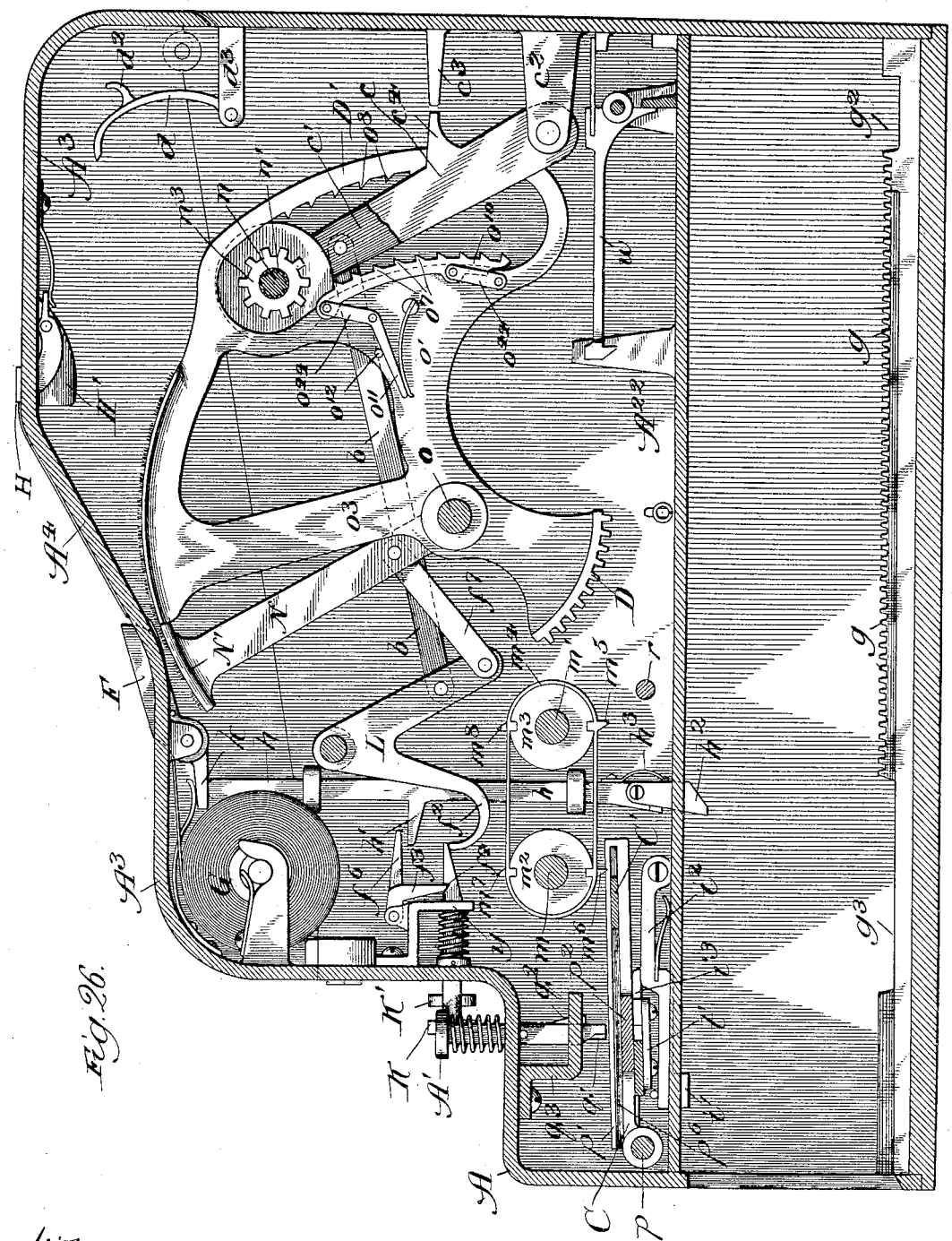

In Fig. 26 is shown a modified construction of the mechanism under control of the keys K and K'. By this modification the heads M and their stems M', as also the fingers $o^9$ on bell-cranks $o^4$, are dispensed with, and the teeth $o^7$ of each slot-link D' are provided on a separate section $o^{10}$, yieldingly supported in position by connection at its opposite ends with the extension $o'$ of the rack D by parallel links $o^{14}$ $o^{14}$, the upper one of which has a rearward-extended spring-pressed finger $o^{11}$, bearing normally against a stop $o^{12}$. The bank of rings, ratchets, and disks on the rod $n$ and forming the register E are carried on arms $c$ and $c'$, at the upper ends of which the rod $n$ is supported at its ends, the arms being pivoted at their lower ends on bearings $c^2$, projecting from the rear wall of the case. The backward movement of the arms $c$ $c'$ is limited by stops $c^3$ on the rear wall of the case to be engaged by projections $c^4$ on the backs of the arms. In this connection only the lever L of the two levers L L' is required, and it is connected from its longer arm by a link-bar $b$ with the arm $c'$. By this modified construction each slot-link D', being formed integral with the corresponding rack D and arm $o^3$, maintains always the same relation to the center at the rod $o$, and the teeth $o^7$ yield when the slot-link drops. The register itself, however, is adjustable with relation to the slot-links, its normal position being that shown in which the ratchets $n^3$ are in the path of the teeth $o^7$. To bring the ratchets in the path of the teeth $o^8$ for the subtracting function, the key K is operated to throw the register, as far as permitted by the stops $c^3$, back by the connection of the lever L with the arm $c'$ through the medium of the link-bar $b$, and to bring the ratchets $n^3$ between the planes of teeth $o^7$ $o^8$, so that they will not be encountered by either set in the rise of a slot-link, the key K' is pressed in to throw the arms $c$ $c'$ and with them the register accordingly.

From the foregoing description it will be realized that the ram action of the machine is the primary and essential feature of my improvement, whether it be employed in a machine of the character to which my invention relates for operating a register or adding or subtracting device alone, or a recording device alone, or either in connection with one or more of the others. Hence I desire to be understood as intending to claim my invention as broadly as the state of the prior art will warrant, while regarding the ram action referred to as being entirely novel in its general purpose in this class of machine.

As to the details of construction and combinations of parts herein described and illustrated in the drawings the nature of the mechanisms and their functions has, to enable them to be understood, rendered necessary minute and elaborate description thereof. This, however, must not be understood to manifest any intention on my part to limit my invention to such particular details and combinations, as they may be variously changed and modified by those skilled in the art without departure from the spirit of my invention. In this connection reference may be had to the suggestion hereinbefore contained that a drawer forms only one of several means that may be employed for performing the functions ascribed to the drawer, and though a drawer is named in some of the broader of the appended claims the term is intended to include any hand or even foot-operated substitute for the drawer for actuating the internal mechanism of the machine. It also occurs to me that the equivalent of the toothed rams B' could be provided in other form on a carriage to coöperate with the racks D without requiring them to reciprocate longitudinally relative to the movable carriage. The form of slot-link D' may differ from that shown without departure from my invention provided it have teeth to engage with a register-ratchet and be adjustable with relation thereto—more particularly for turning the register in one direction or the other by the same direction of movement of the slot-link. It is furthermore quite obvious that for some purposes to which my improved machine may be applied, such as footing up totals on a list of amounts furnished by the recording feature, the numbers on the register-wheels may be adapted to mark (print or puncture) the sheet containing the list of amounts, thereby to record the footing thereon. It will also be quite apparent that if the roll of paper G be composed, as it may be, of two or more rolled sheets any desired number of checks I or lists of the recorded matter may be produced with a single operation of the machine.

What I claim as new, and desire to secure by Letters Patent, is—

1. In a key-operated cash-register, the combination with the keys of a register, register-operating mechanism, and a ram device comprising a laterally-movable carriage, under control of said keys, and one or more rams reciprocably confined on the carriage and projectable longitudinally thereon to a predetermined extent of engagement with said register-operating mechanism and longitudinally movable on said carriage, relative thereto with the carriage at rest to actuate said register-operating mechanism, substantially as described.

2. In a key-operated cash-recorder, the combination with the keys of a recording device and operating mechanism therefor, and a ram device comprising a laterally-movable carriage, under control of said keys, and one or more rams reciprocably confined on the carriage and projectable longitudinally thereon to a predetermined extent of engagement with said operating mechanism and longitudinally movable on said carriage, relative thereto with the carriage at rest to actuate said operating mechanism, substantially as described.

3. In a key-operated cash register and recorder, the combination with the keys of a register, register-operating mechanism and a recording device connected therewith, and a ram device comprising a laterally-movable carriage, under control of said keys, and one or more rams reciprocably confined on the carriage and projectable longitudinally thereon to a predetermined extent of engagement with said operating mechanism and longitudinally movable on said carriage, relative thereto with the carriage at rest to actuate said operating mechanism, substantially as described.

4. In a key-operated cash-recorder, the combination with the keys of a number-recording device and a legend-recording device and operating mechanism therefor, and a ram device, under control of said keys, for actuating said operating mechanism and comprising a laterally-movable carriage supporting one or more longitudinally-reciprocable rams, substantially as described.

5. In a key-operated cash register and recorder, the combination with the keys of a register and register-operating mechanism, a number-recording device and a legend-recording device connected with said operating mechanism, and a ram device, under control of said keys, for actuating said operating mechanism and comprising a laterally-movable carriage supporting one or more longitudinally-reciprocable rams, substantially as described.

6. In a key-operated cash-register, the combination of a set of number-keys, a register, register-operating mechanism, said register and a part of said operating mechanism being relatively adjustable, a ram device, under control of said keys, for actuating said operating mechanism, and comprising a laterally-movable carriage supporting one or more longitudinally-reciprocable rams and a key for controlling the relative adjustment of said part of the operating mechanism and register, substantially as described.

7. In a key-operated cash register and recorder, the combination of a set of number-keys, a register, register-operating mechanism and a recording device connected therewith, said register and a part of said operating mechanism being relatively adjustable, a ram device, under control of said keys, for actuating said operating mechanism, and comprising a laterally-movable carriage supporting one or more longitudinally-reciprocable rams and a key for controlling the relative adjustment of said part of the operating mechanism and register, substantially as described.

8. In a key-operated cash register and recorder, the combination of a set of number-keys, a register, register-operating mechanism and a recording device connected therewith, said register and a part of said operating mechanism being relatively adjustable, a ram device, under control of said keys, for actuating said operating mechanism, and comprising a laterally-movable carriage supporting one or more longitudinally-reciprocable rams and keys for controlling respectively the different relative adjustments of said part of the operating mechanism and register, substantially as described.

9. In a key-operated cash-register, the combination with the keys of a register, register-operating mechanism, a ram device comprising a laterally-movable carriage, under control of said keys, and one or more rams reciprocably confined on the carriage and projectable longitudinally thereon to a predetermined extent of engagement with said register-operating mechanism and longitudinally movable on said carriage, relative thereto with the carriage at rest to actuate said register-operating mechanism, and a hand-actuated agent, such as a drawer, connected with said ram or rams to actuate the same against said operating mechanism, substantially as described.

10. In a key-operated cash-recorder, the combination with the keys of a recording device and operating mechanism therefor, a ram device comprising a laterally-movable carriage, under control of said keys, and one or more rams reciprocably confined on the carriage and projectable longitudinally thereon to a predetermined extent of engagement with said operating mechanism and longitudinally movable on said carriage, relative thereto with the carriage at rest to actuate said operating mechanism, and a hand-actuated agent, such as a drawer, connected with said ram or rams to actuate the same against said operating mechanism, substantially as described.

11. In a key-operated cash register and recorder, the combination with the keys of a register, register-operating mechanism and a recording device connected therewith, a ram device comprising a laterally-movable carriage, under control of said keys, and one or more rams reciprocably confined on the carriage and projectable longitudinally thereon to a predetermined extent of engagement with said operating mechanism and longitudinally movable on said carriage, relative thereto with the carriage at rest to actuate said operating mechanism, means engaging with said ram or rams to actuate the same against said operating mechanism, and a hand-actuated agent, such as a drawer, connected with said ram-actuating means to operate the same, substantially as described.

12. In a key-operated machine of the character described, the combination with the keys of a device for showing transactions on the machine, operating mechanism for said device, and a ram device comprising a laterally-movable carriage under control of said keys, and one or more rams reciprocably confined on the carriage and projectable longitudinally thereon to a predetermined extent, controlled by said keys, of engagement with said operating mechanism and longitudinally movable on said carriage, relative thereto with the carriage at rest to actuate said operating mechanism, substantially as described.

13. In a key-operated machine of the character described, the combination with the keys, of a device for showing transactions on the machine, operating mechanism for said device, a spring-controlled carriage having reciprocably confined on it spring-projectable rams, and provided with a dog-controlled ratchet, a lever extended into the path of a ram against projection thereof and depressible by said keys to remove it from the ram-path, a slide-plate having on its edge opposed to said keys a series of offsets at varying distances from the keys, said plate being extended into said ram-path to be forced by the projecting ram against a depressed key and thereby release the dog-held carriage, to engage said ram, by the movement of the carriage, with said operating mechanism, means for actuating said ram against said operating mechanism, and a hand-actuated agent, such as a drawer, for operating said ram-actuating means, substantially as described.

14. In a key-operated machine of the character described, the combination of a set of depressible keys numbered in series, a device for showing transactions on the machine, operating mechanism for said device, a spring-controlled carriage having reciprocably confined on it spring-projectable rams and provided with a dog-controlled ratchet, a lever extended into the path of a ram against projection thereof and depressible by said keys to remove it from the ram-path, a carriage-returning lever, a spring-controlled slide-plate having on its edge opposed to said keys a series of offsets at varying distances from the keys, said plate being extended into said ram-path to be forced by the projecting ram against a depressed key and thereby release the dog-held carriage to engage said ram, by the movement of the carriage, with said operating mechanism, means for actuating said ram against said operating means, and a hand-actuated agent, such as a drawer, for operating said ram-actuating means and carriage-returning lever, substantially as described.

15. In a key-operated machine of the character described, the combination of a set of keys A' carrying transmitters, a device for showing transactions on the machine, operating mechanism for said device, a spring-controlled carriage having reciprocably confined on it spring-projectable rams having teeth $r^{13}$ and $r^{14}$ and provided with a ratchet, a spring-pressed lever C having a series of openings coinciding with said keys and a tongue $p^3$ normally extending into the path of a ram against projection thereof, a spring-pressed dog $t^5$ on said lever and engaging said ratchet, a plate $C^2$ linked to said lever and carrying a spring-pressed dog $t^2$ to engage said ratchet, a carriage-returning lever, a spring-controlled slide-plate C' having on its edge opposed to said keys a series of offsets at varying distances from the keys, said plate having a tongue $p^{33}$ extended into said ram-path at which to be forced by the projecting ram against a depressed key and actuate its transmitter against said plate $C^2$, thereby releasing the carriage to engage the projected ram with said operating mechanism, means for actuating said ram against said operating mechanism, and a hand-actuated agent, such as a drawer, for operating said ram-actuating means and carriage-returning lever, substantially as described.

16. In a cash-register, the combination of a set of number-keys, a register E having ratchet-actuated number-bearing rings rotatable in one direction for adding and in the contrary direction for subtracting, slot-links D' having sets of teeth $o^7$ and $o^8$ flanking the planes of said ratchets, said register and slot-links being relatively adjustable to engage either set of said teeth with said ratchets, a hand-actuated agent, such as a drawer, slot-link-actuating mechanism under control of said keys and operated by said drawer and a key for controlling the relative adjustment of the slot-links and register, substantially as described.

17. In a key-operated cash-register, the combination with the keys of a register E, a pivotally-supported slot-link having teeth to engage with said register and carrying a rack, and a ram device under control of said keys and having a longitudinally-reciprocable toothed ram to engage with said rack to actuate said slot-link, substantially as described.

18. In a key-operated machine of the character described, the combination with the keys of a device for showing transactions on the machine, racks D connected with said device to actuate it, a ram device comprising a laterally-movable carriage, under control of said keys, and toothed rams reciprocably confined on the carriage and projectable longitudinally thereon to a predetermined extent of engagement with said racks and longitudinally movable on said carriage, relative thereto with the carriage at rest to actuate said racks, and a hand-actuated agent, such as a drawer, connected with said rams to move them against and thereby actuate said racks, substantially as described.

19. In a key-operated machine of the character described, the combination with the keys of a recording device comprising a set of arms journaled on a support and provided with segmental number-bearing heads, and segmental racks D, a recording-lever F supported to operate against said heads through the machine-cover, a ram device comprising a spring-controlled carriage B carrying spring-projectable toothed rams B' to engage with said racks under control of said keys, a carriage-returning lever, means for actuating said rams against said racks, and a hand-actuated agent, such as a drawer, for operating said ram-actuating means, recording-lever and carriage-returning lever, substantially as described.

20. In a key-operated cash register and recorder, the combination with the keys of a register E, a recording device comprising a set of arms $o^3$ journaled on a support and provided with segmental number-bearing heads, said arms having segmental racks D, toothed slot-links D' carried by said arms to engage with the register-ratchets, a recording-lever F supported to operate against said heads through the machine-cover, a ram device comprising a spring-controlled carriage B carrying spring-projectable toothed rams B' to engage with said racks under control of said keys, a carriage-returning lever, means for actuating said rams against said racks, and a hand-actuated agent, such as a drawer, for operating said ram-actuating means, recording-lever and carriage-returning lever, substantially as described.

21. In a key-operated cash register and recorder, the combination with the keys of a register E, a recording device comprising a set of arms $o^3$ journaled on a support and provided with segmental number-bearing heads, said arms terminating in segmental racks D, toothed slot-links D' carried by said arms to engage with the register-ratchets, a recording-lever F supported to operate against said heads through the machine-cover, an operating-rod $h$ for said lever, a ram device comprising a spring-controlled carriage B carrying spring-projectable toothed rams B' to engage with said racks under control of said keys, a carriage-returning lever, means for actuating said rams against said racks, and a hand-actuated agent, such as a drawer, for operating said ram-actuating means, rod and carriage-returning lever, substantially as described.

22. In a key-operated machine of the character described, the combination with the keys of a device for showing transactions on the machine, racks D connected with said device to actuate it, a ram device, under control of said keys, having spring-projectable toothed rams B′ for engaging said racks, a traveling apron carrying abutments for engaging said rams to actuate them against said racks, apron-driving means, and a hand-actuated agent, such as a drawer, for operating said apron-driving means, substantially as described.

23. In a key-operated machine of the character described, the combination with the keys of a device for showing transactions on the machine, segmental racks D journaled on a support and connected with said device to actuate it, a ram device, under control of said keys, having spring-projectable toothed rams B′ for engaging said racks, an apron $m^4$ carrying abutments for engaging said rams, a shaft $m'$ for actuating the apron and carrying loosely a pinion engaging in one direction of its rotation with said shaft, a spring-controlled lever $l$ carrying a rack engaging said pinion, and a hand-actuated agent, such as a drawer, engaging said lever, substantially as described.

24. In a key-operated machine of the character described, the combination of a device for showing transactions on the machine, racks D connected with said device, a ram device comprising a dog-controlled carriage B having a spring-actuated operating-lever $r^5$ carrying a dog $r^7$ and spring-projectable rams B′ provided with teeth $r^{13}$ and $r^{14}$, pawls $w$ engaging the teeth $r^{14}$, means under control of the keys for releasing a ram, by depressing either key, to project it under the force of its spring and release the carriage to permit it to move under the force of its actuating-spring, a spring-actuated lever $l$, means engaged by said lever $l$ for forcing the rams against said racks to operate said device, and a drawer $A^2$ into the path of which the lever $l$ and dog $r^7$ extend, substantially as and for the purpose set forth.

25. In a key-operated machine of the character described, the combination of a set of number-keys, a recording device comprising arms $o^3$, journaled on a support $o$ and terminating in number-bearing segmental heads and provided with racks D, a ram device, under control of said keys, for engaging the racks, an arm N journaled in the machine and having a legend-bearing head N′, means for actuating said ram device against said racks, a hand-actuated agent, such as a drawer, for operating said ram-actuating means, a lever connected with said arm N, a key engaging with said lever for moving said arm, and a recording-lever F working through the machine-cover and operated by said hand-actuated agent, substantially as described.

26. In a key-operated machine of the character described, the combination of a set of number-keys, a recording device comprising arms $o^3$ journaled on a support $o$ and terminating in number-bearing segmental heads and provided with racks D, a ram device, under control of said keys, for engaging the racks, an arm N journaled in the machine and having a legend-bearing head N′, means for actuating said ram device against said racks, a hand-actuated agent, such as a drawer, for operating said ram-actuating means, a lever connected with said arm N, keys K and K′ engaging with said lever for throwing said arm, and a recording-lever F working through the machine-cover and operated by said hand-actuated agent, substantially as described.

27. In a key-operated machine of the character described, the combination of a set of number-keys, a recording device comprising arms $o^3$ journaled on a support $o$ and terminating in number-bearing segmental heads and provided with racks D, a ram device, under control of said keys, for engaging the racks, an arm N journaled in the machine and having a legend-bearing head N′, means for actuating said ram device against said racks, a hand-actuated agent, such as a drawer, for operating said ram-actuating means, a lever L connected with said arm N and having a lip extension $f^2$, keys K and K′ engaging said lip extension, and a recording-lever F working through the machine-cover and operated by said hand-actuated agent, substantially as described.

28. In a key-operated machine of the character described, the combination of a set of number-keys, a recording device comprising arms $o^3$ journaled on a support $o$ and terminating in number-bearing segmental heads and provided with racks D, a ram device, under control of said keys, for engaging the racks, an arm N journaled in the machine and having a legend-bearing head N′, means for actuating said ram device against said racks, a hand-actuated agent, such as a drawer, for operating said ram-actuating means, a lever L connected with said arm N and having a lip extension $f^2$, keys K and K′ engaging said lip extension, a dog $f^3$ engaging said keys K K′ and having a trip-arm $f^6$, a recording-lever F supported to extend in an opening in the machine-cover, and a rod $h$, engaging said recording-lever and having a finger $h'$ projecting into the plane of said trip-arm and extending into the path of said drawer to be actuated thereby, substantially as described.

29. In a key-operated cash-register, the combination of a register E, slot-links D′ having teeth $o^7 o^8$ and yieldingly supported to render them adjustable with relation to the ratchets of the register, movably-supported heads M having stems M' extending into engagement with the slot-link supports, a lever L engaging said heads, and a key engaging said lever and affording means for turning it to move said heads to adjust said slot-links, substantially as described.

30. In a key-operated cash-register, the combination of a register E, racks D journaled on a support $o$ and having extensions $o'$, slot-links D' having teeth $o^7 o^8$ and each supported on a pair of spring-pressed bell-cranks $o^4$ fulcrumed on an extension $o'$ and connected by a link $o^5$, a finger $o^9$ on one of each pair of said bell-cranks, heads M having stems M' and movably supported on said racks and their extensions to engage said stems with said fingers $o^9$, levers L and L' connected by a rod $f'$ bearing against said heads, and a key K engaging one of said levers and affording means for turning them to move said heads and adjust said slot-links, substantially as described.

31. In a cash-register, the combination of a set of keys A', a register E, toothed slot-links D' supported to engage ratchets of said register and connected with racks D journaled on a support $o$, a drawer $A^2$, a carriage B having a ratchet $r^2$ and a spring-controlled operating-lever $r^5$ carrying a dog $r^7$ projecting into the path of the drawer, spring-projectable rams B' confined on said carriage and having teeth $r^{13}$ and $r^{14}$, dogs $w$ engaging said teeth $r^{14}$, a ram-retainer $r^{15}$, a spring-pressed lever C having a series of openings coinciding with said keys and a tongue $p^3$, a spring-pressed dog $t^5$ on said lever and engaging said carriage-ratchet, a plate $C^2$ linked to said lever C and carrying a spring-pressed dog $t^2$ to engage said carriage-ratchet, a spring-controlled slide-plate C' having on its edge opposed to said keys a series of offsets at varying distances from the keys, said plate having a tongue $p^{33}$, an apron $m^4$ carrying abutments in the paths of said rams and actuated by a shaft $m'$ carrying a pinion, and a spring-controlled lever $l$ projecting into the path of the drawer, the whole being constructed and arranged to operate substantially as described.

32. A cash register and recorder comprising, in combination, a cover-equipped case carrying a recording-lever F at an opening in the cover and a check-tearer H, a supply-roll of paper G from which the paper is extended under said lever and over the cover to said tearer, a register E, toothed slot-links D' supported to engage ratchets of said register, said register and slot-links being adjustable one with relation to the other, racks D journaled on a support $o$ and with which said slot-links are connected, arms $o^3$ connected with said racks and having segmental number-bearing heads, an arm N journaled on said support and having a legend-bearing head N', a drawer $A^2$, a carriage B having a ratchet $r^2$ and a spring-controlled operating-lever $r^5$ carrying a dog $r^7$ projecting into the path of the drawer, spring-projectable rams B' confined on said carriage and having teeth $r^{13}$ and $r^{14}$, dogs $w$ engaging said teeth $r^{14}$, a ram-retainer $r^{15}$, a spring-pressed lever C having a series of openings coinciding with said keys and a tongue $p^3$, a spring-pressed dog $t^5$ on said lever and engaging said carriage-ratchet, a plate $C^2$ linked to said lever C and carrying a spring-pressed dog $t^2$ to engage said carriage-ratchet, a spring-controlled slide-plate C' having on its edge opposed to said keys a series of offsets at varying distances from the keys, said plate having a tongue $p^{33}$, an apron $m^4$ carrying abutments in the paths of said rams and actuated by a shaft $m'$ carrying a pinion, a spring-controlled lever $l$ and a rod $h$ projecting into the path of said drawer, said rod carrying a trip-finger $h'$ and engaging with said recording-lever, a lever L connected with said arm N and affording a medium for relatively adjusting the register and slot-links, a lip $f^2$ on said lever, keys K and K' engaging said lip and a dog $f^3$ for said keys and having an arm $f^6$ extending into the path of said trip-finger, the whole being constructed and arranged to operate substantially as described.

JOHN A. HOFF.

In presence of—
R. T. SPENCER,
DAN W. LEE.